Dec. 22, 1942.　　　H. FEICK　　　2,305,958
LUBRICANT STAND
Filed July 5, 1940　　　2 Sheets-Sheet 1

INVENTOR.
Harry Feick.
BY Shoodling and Krost
Attorneys.

Dec. 22, 1942.     H. FEICK     2,305,958

LUBRICANT STAND

Filed July 5, 1940     2 Sheets-Sheet 2

INVENTOR.
Harry Feick
BY Hoodling and Kroet
Attorneys.

Patented Dec. 22, 1942

2,305,958

UNITED STATES PATENT OFFICE 2,305,958

LUBRICANT STAND

Harry Feick, Cleveland, Ohio

Application July 5, 1940, Serial No. 344,038

6 Claims. (Cl. 211—8)

My invention relates in general to service stands and more particularly to stands for containers such, for example, as oil or grease containers sold at garages and automotive service stations.

In the arrangement of automotive service stations and garages, the practice has grown up of displaying or storing lubricant containers upon a service stand or rack. The displaying of the lubricant containers in this manner not only increases purchasing desires and builds up good will but also facilitates the work of the garage or station attendant by reducing the time required to service a customer's car. In the daily conduct of a garage or service station, it becomes necessary to move the stand with lubricant containers thereon from the inside of the building to the outside and then back again. In doing this, with the racks or stands in the past, quite a few of the containers would fall off. Besides this, it has been found that the displayed containers of lubricant would be stolen when the garage or service station attendants were not looking.

Therefore, an object of my invention is the provision of a lubricant stand which provides for holding or locking the lubricant containers in the service stand to avoid the possibility of the lubricant containers being stolen or falling off while moving the stand.

Another object of my invention is the provision of a lubricant container having holding or locking means incorporated therein which enables the garage or station attendant to readily release or unlock the containers.

Another object of my invention is the provision of a holding or locking unit for a lubricant stand in which the holding or locking unit is movable up-and-down with reference to the table or shelf that supports the containers.

Another object of my invention is the provision of a holding or locking means for a lubricant stand which may be readily manufactured to accommodate containers of variable sizes to give universal container application.

Other objects and a fuller understanding of my invention may be had by referring to the following description and claims, taken in conjunction with the accompanying drawings, in which:

Figure 1:
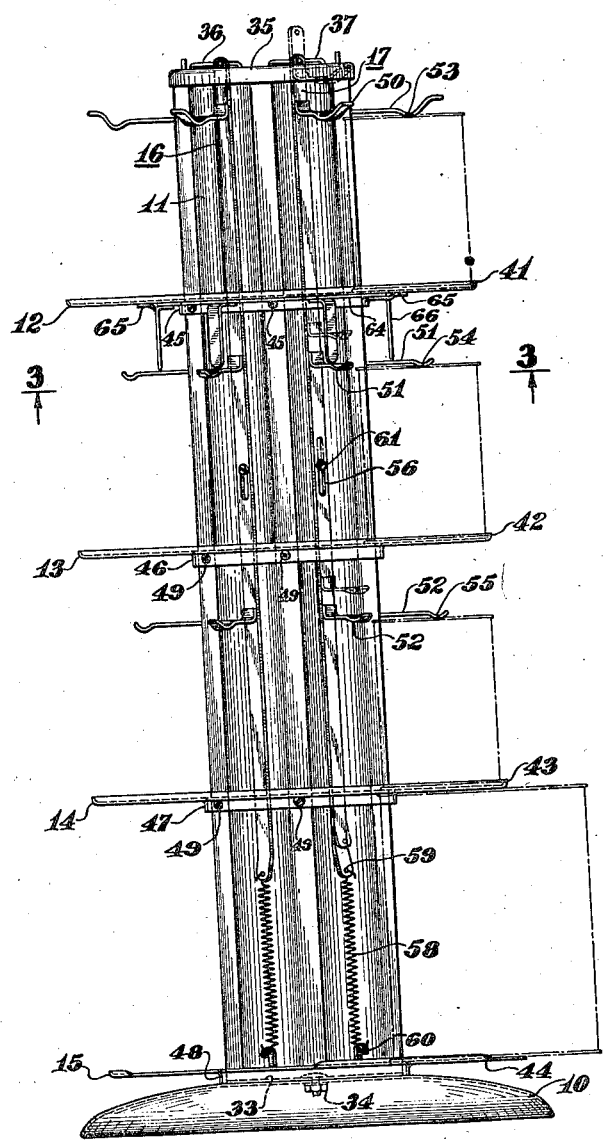
Figure 1 represents a side elevational view of my lubricant stand, in which the containers to be supported are illustrated by the dash-dot line.

With reference to the drawings, my invention comprises generally a base 10, an upright support or member 11 supported by the base, a plurality of tables or shelves 12, 13, 14 and 15 carried by the upright support and a plurality of slidable holding or locking units each represented generally by the reference characters 16, 17, 18, 19, 20 and 21 slidably fastened in an upright position to the upright member 11.

The base 10 may be made of any suitable material and I preferably construct it of stamped sheet metal with a curved upper surface to give strength and rigidity. The upright support or member 11 is preferably constructed of stamped sheet metal and may be rigidly secured to the top of the base 10 by means of the combination of a cross strap member 33 which extends substantially diametrically across the inside edges of the upright support 11 and a nut and bolt 34 which extend through the cross strap member and the top of the base 10. As illustrated, the upright support 11 is provided with a plurality of vertically extending arcuate indentures 27, 28, 29, 30, 31 and 32 to provide a partial recess to receive the inside edges of the containers concentrically spaced about the upright support 11 upon the tables or shelves 12. The upper end of the upright support 11 may be capped with a top cover 35 which may be held thereon by any suitable means. Fastened to the top cover 35 are two handles 36 and 37 which provide hand grasps for carrying the lubricant stand from place to place. The handles 36 and 37 are loosely anchored to the top cover 35 so that as one grasps the two handles 36 and 37 they lift up sufficiently to enable one to insert his fingers between the top edge of the cover 35 and the handles 36 and 37. When the handles are not in use they lie flat next to the top surface of the cover 35. This is the position shown in Figure 1.

The tables or shelves 12, 13 and 14 are of similar construction and each is provided with continuous external peripheral flanges 41, 42 and 43 and continuous internal peripheral flanges 45, 46 and 47.

Figure 2:
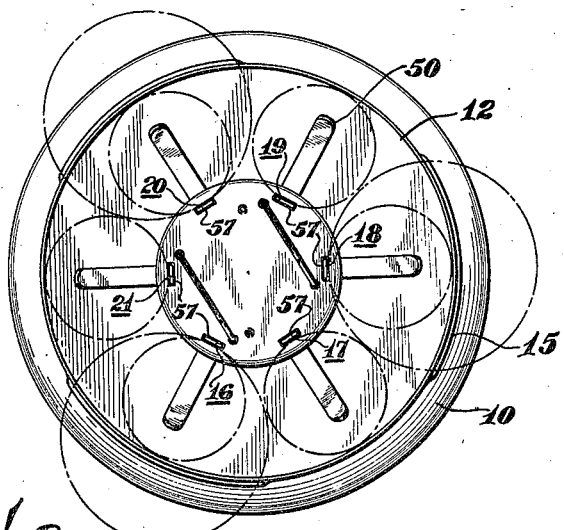
Figure 2 is a top plan view of the device shown in Figure 1 in which the containers to be supported are illustrated by the dash-dot line.

The external peripheral flanges 41, 42 and 43 extend upwardly so that they are engaged by the lower edges of the containers supported by the shelves or the tables. The internal peripheral flanges 45, 46 and 47 extend downwardly and closely engage the external surface of the upright support 11 and are suitably anchored thereto such, for example, as by the screws 49. The lowermost shelf or table 15 is provided at spaced intervals with non-continuous external peripheral flanges 44 and with a continuous internal peripheral flange 48 which rests on top of the base 10. The interval spacing between the external peripheral flanges 44 of the lowermost shelf 15 is flat to provide a surface for the supporting of large containers such, for example, as a gallon or a five quart container. As shown in Figure 2, three such large containers may be positioned around the upright support 11 upon the lowermost shelf or table 15. The loading of the lowermost shelf with large containers tends to secure or stabilize the stand from being easily tipped or pushed over. The tables or shelves 12, 13 and 14 are vertically spaced about the upright support 11 to receive smaller lubricant containers such, for example, as a quart container.

The slidable locking units 16, 17, 18, 19, 20 and 21 are of the same construction and each comprises a relatively long slidable member slidably fastened in an upright position to the upright support or member 11 and equally spaced thereabout within the vertical arcuate indentures. Each relatively long slidable member is provided with three radial extension arms or members 50, 51 and 52 for engaging the top of the containers. Inasmuch as each of the slidable locking units are of the same construction, the reference characters for each of the sub-parts are the same and the description with reference to one or more slidable locking units applies to all of them. Each of the extension arms 50, 51 and 52 are provided with depressed portions 53, 54 and 55 which engage the top of the container being supported by the tables 12, 13 and 14. The uppermost extension arm 50 is provided with a somewhat longer external end than the other arms to provide a finger grip for the operator when raising the slidable locking units. As illustrated in Figure 1, the relatively long slidable members are provided with an elongated slot 56 through which a screw or other suitable means 61 extends for vertically guiding the members up-and-down with reference to the upright support 11. In Figure 1, one of the slidable locking units is also shown by dash-and-dot lines to indicate its raised position. The top cover 35 is provided at spaced intervals with a plurality of guide slots 57 to receive the upper end of the slidable members and serve as a guide therefor. Each of the slidable locking units is constrained downwardly by means of a spring 58 which is anchored to a hook 60 provided on the upright support 11 and an opening 59 in the lower end of each of the relatively long slidable members. Therefore, when removing a container from the supporting tables, it is only necessary for the service or garage station attendant to grasp the outer end of the uppermost extension arm on one of the relatively long members and slide the entire holding or locking unit upwardly to free the container. The raising of one of the slidable locking or holding units frees or releases three containers, one above the other.

Figure 3:
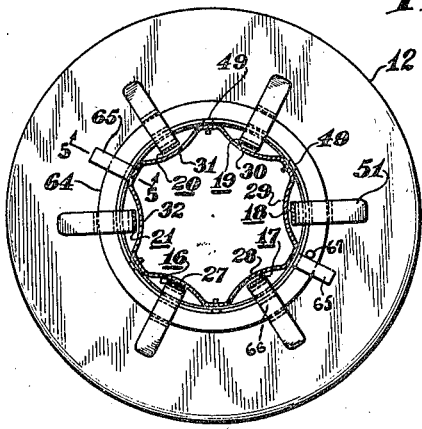
Figure 3 is a cross-sectional view taken along the line 3—3 of Figure 1, looking upwardly underneath one of the tables or shelves and showing the locking arrangement in the locked position.
Figure 5:
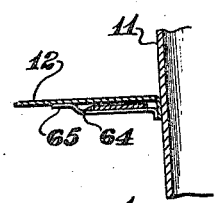
Figure 5 is an enlarged cross-sectional view taken along the line 5—5 of Figure 3.
Figure 4:
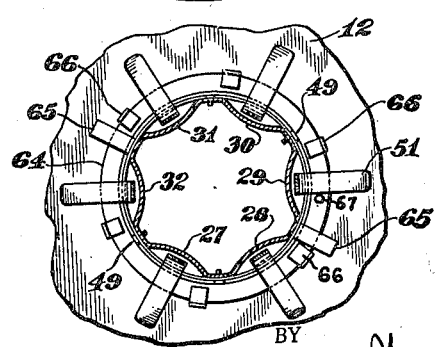
Figure 4 is a view similar to Figure 3 but showing the locking arrangement in the released position.

A stop or dog arrangement designed to keep the containers held or locked upon the shelves or tables is mounted underneath of the table 12 and comprises an annular member 64 mounted to slide rotatively within two brackets 65 under the table 12. Anchored to and extending downwardly from the annular member 64 at spaced intervals are a plurality of locking dogs or stop means 66. The spacing of the stop members 66 is arranged at intervals to coincide substantially with the interval spacing of the slidable locking units, so that in one position the dog or stop means 66 are aligned vertically over the extension arms 51 and prevent the raising of all the locking units. The alignment of the stop or dog means 66 over the extension arms 51 by the rotation of the annular member 64 is determined upon the engagement of a boss or pin 67 carried by the annular member 64 with one of the brackets 67. This is the position shown in Figure 3. All of the locking units are simultaneously released or unlatched upon the turning of the annular member 64 which causes the stop members 66 to clear the extension arms. The arresting of the rotation of the annular member 64 for the release position is effected upon the engagement of one of the stop or dog members 66 with the bracket 65 that was engaged by the pin 67. The released or unlocked position is shown in Figure 4.

Inasmuch as the stop arrangement is underneath of the table 12 it is not ordinarily in clear view to be observed by a person. It may be operated by the gas station attendants without observation by the customer. When the stop means 66 or dogs are in alignment with the top surface of the extension arms 51 the containers are held or locked upon the shelves 12, 13 and 14 because the containers cannot be raised sufficiently to have the lower edge thereof clear the upturned flanges 41, 42 and 43. The locking units provided by my invention are not designed primarily to secure 100 percent protection against stealing the containers, but afford sufficient security against a customer who might attempt to steal one or more of the containers when the attendant is not looking. My device makes it unhandy for a customer to take a container and offers sufficient frustration or harassment to disturb a person who might otherwise quickly toss a container into his car while being unnoticed by the gas or garage attendant.

By first removing the large containers from the lowermost shelf 15, the attendant may "wheel" my stand from place to place upon the periphery of the base 10, as one would a barrel, with the small containers secured on the shelves 12, 13 and 14. The springs 58 may be made strong enough to hold the containers upon the shelves without the employment of the stop or dog means 66. Therefore, my lubricant stand provides for holding or locking the lubricant containers upon the shelves which avoids the possibility of the containers being stolen or falling off the shelves while moving the stand.

My locking or holding units are of such design that they may be readily manufactured to accommodate containers of variable sizes to give universal container application. Containers of increased length may be accommodated by shortening the length of the stop or dog members 66 in which case the holding or locking units engage the top of the containers at a higher elevation permitted by the slidable movement of the relatively long members sliding relative to the upright support 11 under the tension of the springs 58.

While I have described my invention as having particular application to garages and service stations, it is to be understood that my invention has utility in connection with containers of all kinds.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A service stand for containers comprising, in combination, an upright member, a base for supporting the upright member, a plurality of service tables carried by and extending radially from the upright member for supporting a row of containers radially about the upright member, each of said tables having an upwardly extending peripheral ledge and being spaced vertically apart from each other at a distance greater than the height of the containers to be supported thereon, and locking means in cooperation with the tables for locking the containers upon the service tables, said locking means comprising a plurality of relatively long slidable members slidably fastened in an upright position to the upright member at spaced intervals therearound, a plurality of vertically spaced extension members anchored to each of the slidable members and extending radially therefrom for engaging the top of the containers being supported by the tables, the extension members anchored to each of the slidable members being movable up-and-down as a unit upon movement of the slidable member, said extension members in cooperation with the peripheral ledge of the tables holding the containers on the tables, resilient means for urging each of the slidable members downwardly and causing the extension members anchored thereto to engage the top of the containers being supported by the tables, and stop means for each of said slidable members to oppose the upward movement of each of the slidable members and the extension members anchored thereto to lock the containers on the tables.

2. A service stand for containers comprising, in combination, an upright member, a base for supporting the upright member, a plurality of service tables carried by and extending radially from the upright member for supporting a row of containers radially about the upright member, each of said tables having an upwardly extending peripheral ledge and being spaced vertically apart from each other at a distance greater than the height of the containers to be supported thereon, and locking means in cooperation with the tables for locking the containers upon the service tables, said locking means comprising a plurality of relatively long slidable members slidably fastened in an upright position to the upright member at spaced intervals therearound, a plurality of vertically spaced extension members anchored to each of the slidable members and extending radially therefrom for engaging the top of the containers being supported by the tables, the extension members anchored to each of the slidable members being movable up-and-down as a unit upon movement of the slidable member, said extension members in cooperation with the peripheral ledge of the tables holding the containers on the tables, resilient means for urging each of the slidable members downwardly and causing the extension members anchored thereto to engage the top of the containers being supported by the tables, stop means for each of said slidable members to oppose the upward movement of each of the slidable members and the extension members anchored thereto to lock the containers on the tables, and means for simultaneously operating the stop means for the said slidable members.

3. A service stand for containers comprising, in combination, an upright member, a base for supporting the upright member, a plurality of service tables carried by and extending radially from the upright member for supporting a row of containers radially about the upright member, each of said tables having an upwardly extending peripheral ledge and being spaced vertically apart from each other at a distance greater than the height of the containers to be supported thereon, and locking means in cooperation with the tables for locking the containers upon the service tables, said locking means comprising a plurality of relatively long slidable members slidably fastened in an upright position to the upright member at spaced intervals therearound, a plurality of vertically spaced extension members anchored to each of the slidable members and extending radially therefrom for engaging the top of the containers being supported by the tables, the extension members anchored to each of the slidable members being movable up-and-down as a unit upon movement of the slidable member, said extension members in cooperation with the peripheral ledge of the tables holding the containers on the tables, resilient means for urging each of the slidable members downwardly and causing the extension members anchored thereto to engage the top of the containers being supported by the tables, stop means for each of said slidable members to oppose the upward movement of each of the slidable members and the extension members anchored thereto to lock the containers on the tables, and means for simultaneously operating the stop means for the said slidable members, said operating means comprising an annular member movably mounted underneath one of said tables and carrying the stop means at spaced intervals therearound to coincide substantially with the interval spacing of the relatively long slidable members around the upright member.

4. A service stand for containers comprising, in combination, an upright member, a base for supporting the upright member, a plurality of service tables carried by the upright member for supporting the containers, each of said tables being spaced vertically apart from each other at a distance greater than the height of the containers to be supported thereon and having upwardly extending means near the edge thereof, and locking means in cooperation with the tables for locking the containers upon the service tables, said locking means comprising a relatively long slidable member slidably fastened in an upright position with respect to the tables, a plurality of vertically spaced extension members anchored to the slidable member and extending therefrom for engaging the top of the containers being supported by the tables, the said extension members being movable up-and-down as a unit upon movement of the slidable member, said extension members in cooperation with the said upwardly extending means on the tables holding the containers on the tables, and stop means for the said slidable member to oppose the upward movement thereof and the extension members anchored thereto to lock the containers on the tables.

5. A service stand for containers comprising, in combination, an upright member, a base for supporting the upright member, a plurality of service tables carried by the upright member for supporting the containers, each of said tables being spaced vertically apart from each other at a distance greater than the height of the containers to be supported thereon and having upwardly extending means near the edge thereof, and locking means in cooperation with the tables for locking the containers upon the service tables, said locking means comprising a relatively long slidable member slidably fastened in an upright position with respect to the tables, a plurality of vertically spaced extension members anchored to the slidable member and extending therefrom for engaging the top of the containers being supported by the tables, the said extension members being movable up-and-down as a unit upon movement of the slidable member, said extension members in cooperation with the said upwardly extending means on the tables holding the containers on the tables, resilient means for urging the slidable member downwardly and causing the extension members anchored thereto to engage the top of the containers being supported by the tables, and stop means for the said slidable member to oppose the upward movement thereof and the extension members anchored thereto to lock the containers on the tables.

6. A service stand for containers comprising, in combination, an upright member, a base for supporting the upright member, a plurality of service tables carried by the upright member for supporting the containers, each of said tables being spaced vertically apart from each other at a distance greater than the height of the containers to be supported thereon and having upwardly extending means near the edge thereof, and locking means in cooperation with the tables for locking the containers upon the service tables, said locking means comprising a relatively long slidable member slidably fastened in an upright position with respect to the tables, a plurality of vertically spaced extension members anchored to the slidable member and extending therefrom for engaging the top of the containers being supported by the tables, the said extension members being movable up-and-down as a unit upon movement of the slidable member, said extension members in cooperation with the said upwardly extending means on the tables holding the containers on the tables, and stop means for the said slidable member to oppose the upward movement thereof and the extension members anchored thereto to lock the containers on the tables, said stop means comprising a member mounted underneath one of the service tables and being movable relative to the slidable member to make engagement therewith and oppose the upward movement thereof.

HARRY FEICK.